US012794296B2

(12) United States Patent
Fan et al.

(10) Patent No.: US 12,794,296 B2
(45) Date of Patent: Nov. 10, 2026

(54) ROTOR, ELECTRIC MACHINE AND VEHICLE

(71) Applicant: Valeo eAutomotive Germany GmbH, Erlangen (DE)

(72) Inventors: Pengcheng Fan, Erlangen (DE); Wei Zhu, Erlangen (DE); Xuejun Zhang, Erlangen (DE); Renlong Ying, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 211 days.

(21) Appl. No.: 18/390,723

(22) Filed: Dec. 20, 2023

(65) Prior Publication Data

US 2024/0213836 A1 Jun. 27, 2024

(30) Foreign Application Priority Data

Dec. 21, 2022 (CN) ........................ 202211650679.X

(51) Int. Cl.
*H02K 1/32* (2006.01)
*H02K 1/276* (2022.01)

(52) U.S. Cl.
CPC ............... *H02K 1/32* (2013.01); *H02K 1/276* (2013.01)

(58) Field of Classification Search
CPC ........ H02K 1/276; H02K 1/2766; H02K 1/32; H02K 9/19

(Continued)

(56) References Cited

U.S. PATENT DOCUMENTS 8,080,908 B2 * 12/2011 Matsubara ............... H02K 1/32 310/156.53
8,492,941 B2 * 7/2013 Endo ........................ H02K 1/32 310/59

(Continued)

FOREIGN PATENT DOCUMENTS

CN 204906112 U 12/2015
CN 207691548 U 8/2018

(Continued)

OTHER PUBLICATIONS

Translation of foreign document WO 2021105631 A1 (Year: 2021).*
Extended European Search Report issued May 16, 2024 in European Patent Application No. 23218521.5, 9 pages.

*Primary Examiner* — Alex W Mok
(74) *Attorney, Agent, or Firm* — Oblon, McClelland, Maier & Neustadt, L.L.P.

(57) ABSTRACT

A rotor includes a rotor shaft, having a rotation axis; a rotor body, fixed to the rotor shaft and formed of multiple stacked laminations. Magnet mounting grooves are provided in the rotor body, and multiple magnets are disposed in the magnet mounting grooves, with a gap formed between each magnet and an inner wall of the corresponding magnet mounting grooves. First and second end plates are respectively disposed at two ends of the rotor body along the rotation axis. A fluid cooling system includes a slot, disposed on one of the first end plate and second end plate, and located on a side of this end plate that faces towards the rotor body; a through-hole, disposed on the other of the first end plate and second end plate; and the gap. The slot, the gap and the through-hole are in fluid communication to form a cooling medium channel.

16 Claims, 4 Drawing Sheets

(58) Field of Classification Search
USPC .............................................................. 310/58
See application file for complete search history.

(56) References Cited

U.S. PATENT DOCUMENTS

| | | | | |
|---|---|---|---|---|
| 8,928,195 | B2 * | 1/2015 | Ohashi | H02K 9/19 310/58 |
| 11,277,056 | B2 * | 3/2022 | Chernogorski | H02K 17/168 |
| 11,418,077 | B2 * | 8/2022 | Krais | H02K 7/003 |
| 2019/0393746 | A1 * | 12/2019 | Takemoto | H02K 1/06 |
| 2020/0186007 | A1 * | 6/2020 | Kitao | H02K 15/03 |
| 2020/0244123 | A1 * | 7/2020 | Kang | H02K 9/19 |
| 2021/0351664 | A1 * | 11/2021 | Jackson | H02K 7/006 |
| 2022/0399770 | A1 | 12/2022 | Tardy et al. | |

FOREIGN PATENT DOCUMENTS

| | | | |
|---|---|---|---|
| CN | 209299073 | U | 8/2019 |
| CN | 111384795 | A | 7/2020 |
| CN | 212543475 | U | 2/2021 |
| CN | 113922537 | A | 1/2022 |
| CN | 216851493 | U | 6/2022 |
| CN | 115333270 | A | 11/2022 |
| EP | 1 953 896 | A1 | 8/2008 |
| WO | WO 2021/105631 | A1 | 6/2021 |

* cited by examiner

ROTOR, ELECTRIC MACHINE AND VEHICLE

TECHNICAL FIELD

The present disclosure relates to a rotor for an electric machine, an electric machine comprising the rotor, and a vehicle.

BACKGROUND ART

An electric machine is an apparatus capable of accomplishing electromechanical energy conversion, and is widely used in the automotive field. An electric machine generally comprises a stator, a rotor, windings and magnets, etc. High temperatures will develop in an electric machine during operation, e.g. during high-speed operation, and these high temperatures will cause demagnetization of the magnets. This will affect the stability and reliability of the electric machine, and in severe cases, the electric machine will need to be replaced. In addition, at high rotation speeds at high temperatures, the rotor of an electric machine will split into layers, and this will also affect the stability and reliability of the electric machine, e.g. the NVH performance of the electric machine, i.e. noise, vibration and harshness, and may even cause the electric machine to fail.

At present, magnet mounting grooves for mounting magnets in the rotors of commonly used electric machines are generally filled with resin, for the purpose of fixing the magnets and increasing heat conduction between the magnets and the rotor laminations. An electric machine designed in this way can generally only be cooled at the exterior of the rotor and the rotor shaft. Thus, the rotor cannot be cooled effectively, and the magnets disposed inside the rotor cannot be cooled.

Therefore, it would be desirable if any improvement for an electric machine in which the rotor interior and the magnets can be cooled effectively.

SUMMARY OF THE INVENTION

The objective of the present disclosure is to provide an electric machine rotor and an electric machine, the rotor having a fluid cooling system, which can achieve effective cooling of the rotor, and in particular the rotor interior and the magnets.

This objective is achieved by means of the rotor and the electric machine comprising same according to the present disclosure, which are described below.

The present disclosure relates to a rotor for an electric machine, the rotor comprising:

- a rotor shaft, having a rotation axis;
- a rotor body, fixed to the rotor shaft and formed of multiple stacked laminations, wherein magnet mounting grooves are provided in the rotor body;
- multiple magnets disposed in the magnet mounting grooves, with a gap formed between each magnet and an inner wall of the corresponding magnet mounting grooves;
- a first end plate and a second end plate, respectively disposed at two ends of the rotor body along the rotation axis,
- wherein the rotor further comprises a fluid cooling system, the fluid cooling system comprising:
  - a slot, disposed on one of the first end plate and second end plate, and located on a side of this end plate that faces towards the rotor body;
  - a through-hole, disposed on the other of the first end plate and second end plate; and
  - the gap,
- and wherein the slot, the gap and the through-hole are in fluid communication to form a cooling medium channel.

In an embodiment, the fluid cooling system further comprises an opening disposed on a wall of the rotor shaft, the opening being in fluid communication with the slot, and a cooling medium being able to flow from the opening into the cooling medium channel.

In an embodiment, the cooling medium is recovered after sequentially flowing through the opening, the slot, the gap and the through-hole.

In an embodiment, the slot extends outwards from an inner edge of the corresponding end plate and at least partly covers the gap.

In an embodiment, slots and through-holes arranged alternately are provided on each of the first end plate and second end plate.

In an embodiment, the slots and through-holes of at least one of the first end plate and second end plate are arranged equidistantly in the circumferential direction of the corresponding end plate.

In an embodiment, the magnet mounting grooves comprise multiple groups of mounting slots which are radially offset, the slot and the through-hole being respectively aligned with gaps of the multiple groups of mounting slots.

In an embodiment, the slot extends radially outwards in a tapering manner.

In an embodiment, the magnets are disposed in the magnet mounting grooves by snap-fitting.

The present disclosure further relates to an electric machine, comprising a stator and the rotor described above.

The present disclosure further relates to a vehicle comprising the electric machine described above.

The technical solution of the present disclosure has the following advantages: by providing the fluid cooling system for the rotor, efficient cooling of the rotor interior and magnets can be achieved; by using a bidirectional fluid configuration for cooling, cooling efficiency can be increased. Thus, the electric machine and rotor of the present disclosure can avoid magnet demagnetization caused by high temperatures and splitting of the rotor into layers due to high rotation speeds at high temperatures, thus having improved stability and reliability and achieving higher power.

DETAILED DESCRIPTION OF EMBODIMENTS

In order to clarify the objective, technical solution and advantages of embodiments of the present disclosure, the technical solution of embodiments of the present disclosure is described clearly and completely below in conjunction with the drawings accompanying embodiments of the present disclosure.

Unless otherwise defined, technical terms or scientific terms used herein shall have the common meanings understood by those skilled in the art. The words "first", "second", and the like used in the Description and claims of the patent application disclosed herein do not indicate any order, quantity or importance, being merely used to distinguish different component parts. Likewise, "a", "one", "the" or similar words do not indicate a quantity limit, but mean at least one. "Comprises" or "includes" and similar words mean that the element or object appearing before the word encompasses the elements or objects and their equivalents listed after the word, without excluding other elements or objects.

Figure 1:
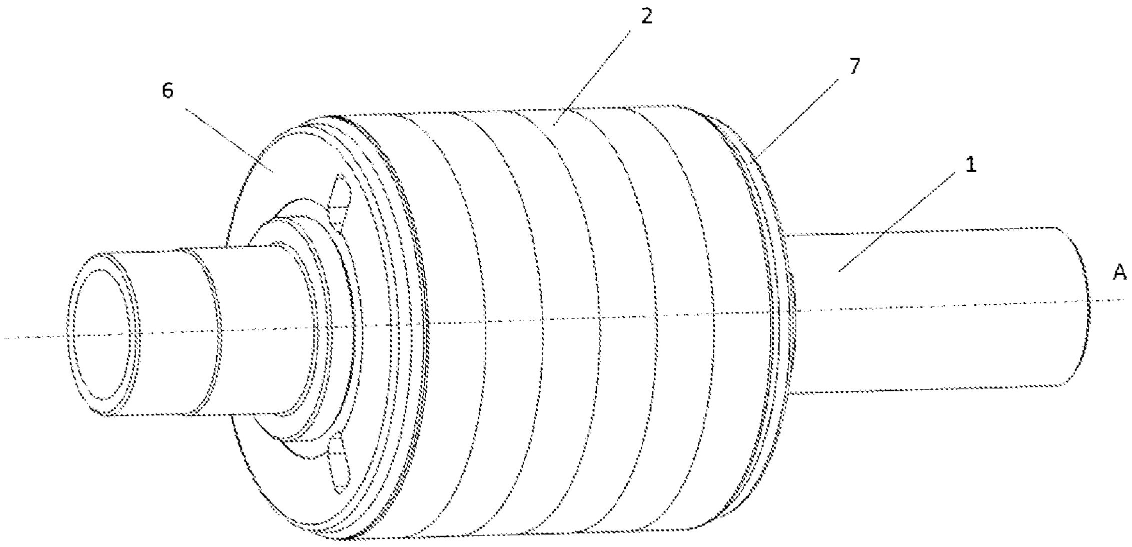
FIG. 1 is a schematic drawing of a rotor for an electric machine according to an embodiment of the present disclosure.
Figure 7:
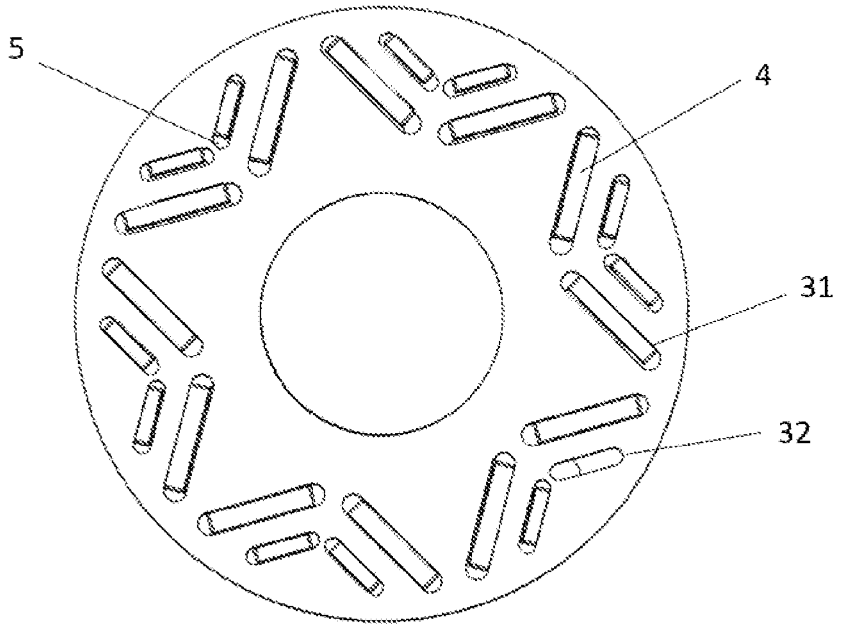
FIG. 7 is a schematic drawing of a rotor body of a rotor for an electric machine according to another embodiment of the present disclosure.

The electric machine of the present disclosure may comprise a rotor and a stator as shown in FIG. 1. The electric machine may be used for a new energy vehicle, and comprises a stator, a rotor, windings and magnets, etc. disposed in a cavity thereof. The rotor comprises a rotor shaft 1, a rotor body 2, a first end plate 6 and a second end plate 7. In addition, as shown in FIG. 7, the rotor further comprises multiple magnets 4.

Figure 2:
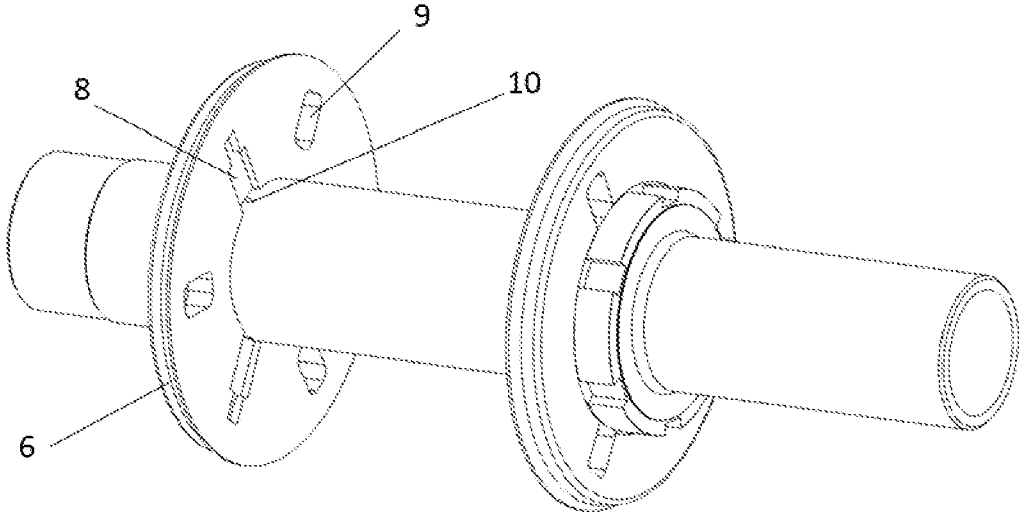
FIG. 2 is a schematic drawing of part of a rotor for an electric machine according to an embodiment of the present disclosure.
Figure 4:
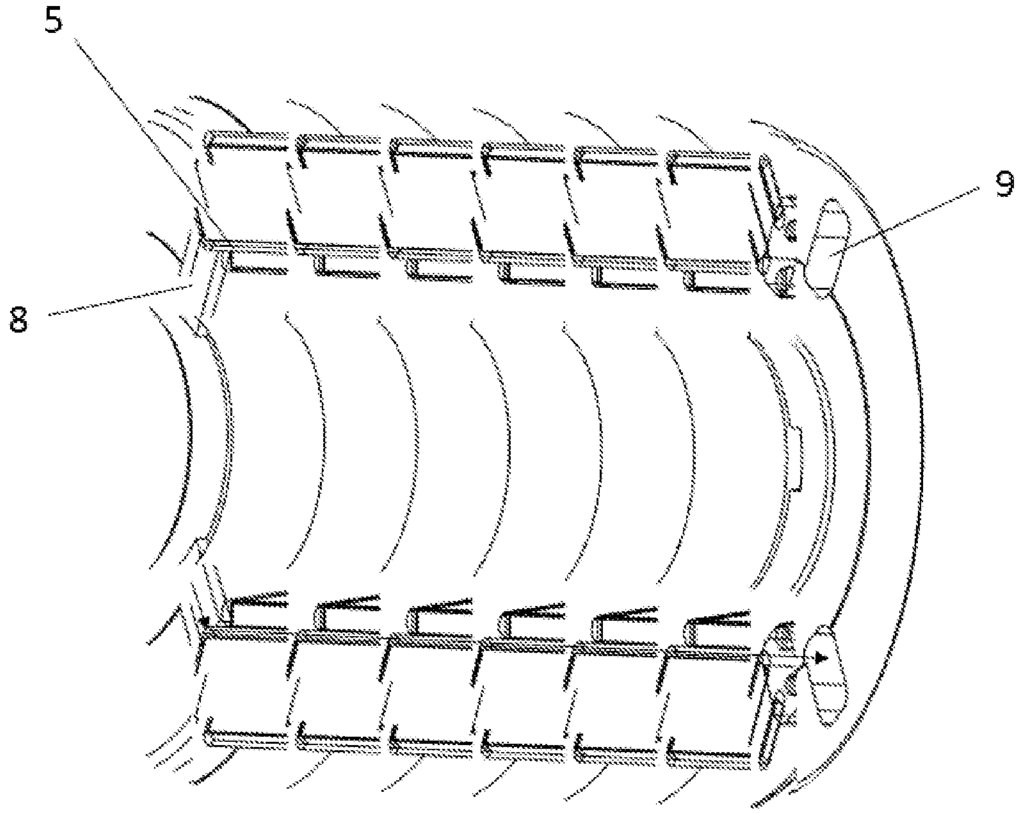
FIG. 4 is a schematic sectional drawing of part of a rotor for an electric machine according to an embodiment of the present disclosure.

As shown in FIG. 2, the rotor shaft 1 has a rotation axis A. The rotor body 2 is fixed to the rotor shaft 1 and formed of multiple stacked laminations, and magnet mounting grooves 3 are provided in the rotor body 2. The magnet mounting grooves extend substantially in a direction parallel to the rotation axis A. As shown in FIGS. 4 and 7, the multiple magnets 4 are disposed in the magnet mounting grooves 3, and a gap 5 is formed between each magnet and an inner wall of the corresponding magnet mounting grooves 3. Specifically, in a direction perpendicular to the rotation axis A, i.e. in a radial direction of the rotor, gaps 5 are formed between the inner wall of the magnet mounting grooves 3 and each of two sides of the magnet 4. In the rotor of the present disclosure, the magnet mounting grooves 3 are no longer filled with resin; the magnets 4 are disposed in the magnet mounting grooves 3 by snap-fitting for example. In this way, the magnet can be fixed while also ensuring that there are gaps 5 between the magnet mounting grooves 3 and the magnet 4.

As shown in FIG. 1, the first end plate 6 and second end plate 7 are respectively disposed at two ends of the rotor body 2 along the rotation axis A.

Figure 3:
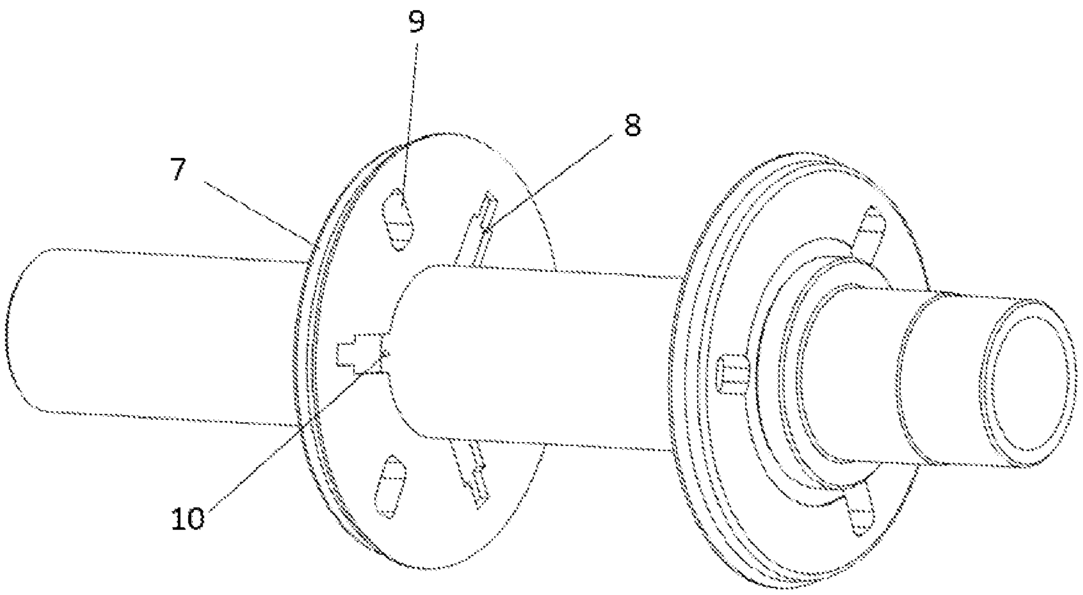
FIG. 3 is a schematic drawing of part of a rotor for an electric machine according to an embodiment of the present disclosure, viewed from another direction.

The rotor of the present disclosure further comprises a fluid cooling system for itself, the fluid cooling system comprising slots 8, through-holes 9, and the gaps 5 described above. As shown in FIGS. 2-5, the slots 8 are disposed on one of the first end plate 6 and second end plate 7, and located on the side of this end plate that faces towards the rotor body 2. The through-holes 9 are disposed on the other of the first end plate 6 and second end plate 7. As shown in FIGS. 2 and 3, slots 8 and through-holes 9 arranged alternately are provided on each of the first end plate 6 and second end plate 7. In a direction parallel to the extension axis A, the slots 8 on the first end plate 6 correspond to the through-holes 9 on the second end plate 7, and the through-holes 9 on the first end plate 6 correspond to the slots on the second end plate 7. The slots 8, the gaps 5 and the through-holes 9 are in fluid communication to form cooling medium channels. Of course, it is also possible that slots and through-holes on the same end plate are not arranged alternately.

As shown in FIGS. 2 and 3, the fluid cooling system further comprises an opening 10 disposed on a wall of the rotor shaft 1, the opening being in fluid communication with the slot 8, and a cooling medium being able to flow from the opening 10 into the cooling medium channel. The cooling medium is an electrically non-conductive medium, and may be oil; the cooling oil is pumped by a pump into the cavity of the electric machine from a gearbox and flows into an internal cavity of the rotor shaft 1, then flows from the opening 10 into the rotor interior, so as to cool the rotor interior.

As a result of providing the fluid cooling system located substantially in the rotor interior, effective cooling of the rotor interior and magnets can be achieved by means of the cooling medium, reducing the rotor temperature, and avoiding the problems of magnet demagnetization caused by high temperatures and splitting of the rotor into layers due to high rotation speeds at high temperatures.

For example, the cooling medium flows from the opening 10 near the first end plate 6 into the slot 8 on the first end plate 6, then flows into the gap 5 in communication therewith, and then flows out of the rotor through the through-hole 9 on the second end plate 7, thereby cooling the rotor interior and magnets, as shown by the black arrow in FIG. 4. The cooling medium may also flow from the opening 10 near the second end plate 7 into the slot 8 on the second end plate 7, then flow into the gap 5 in communication therewith, and then flow out of the rotor through the through-hole 9 on the first end plate 6; cooling of the rotor interior and magnets may also be achieved in this way. The circulation direction of the cooling medium in the second circulation configuration is essentially opposite to the circulation direction of the cooling medium in the first circulation configuration. It should be noted that the cooling medium may circulate in both of the circulation configurations described above at the same time. By employing such a configuration with circulation in both directions, a larger cooling area can be achieved, for efficient cooling of the rotor interior and magnets.

For example, the cooling medium is recovered after sequentially flowing through the opening 10, the slot 8, the gap 5 and the through-hole 9. The cooling medium may be recovered into a cooling medium circulation system of the electric machine. For example, the cooling medium is recovered into a cooling oil circulation system of a gearbox. Specifically, the cooling medium flowing out of the through-hole 9 on the first end plate 6 or second end plate 7 flows to the bottom of a housing of the electric machine system, and is then recovered to the gearbox.

Figure 5:
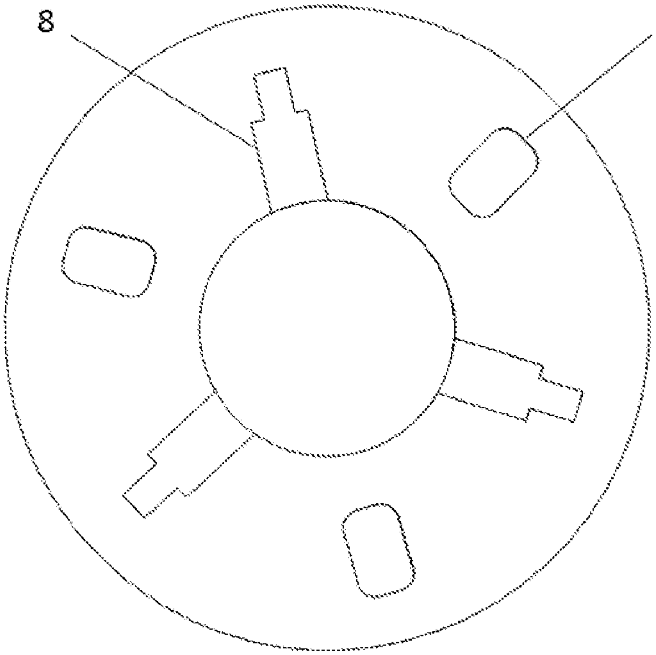
FIG. 5 is a schematic drawing of an end plate of a rotor for an electric machine according to another embodiment of the present disclosure.
Figure 6:
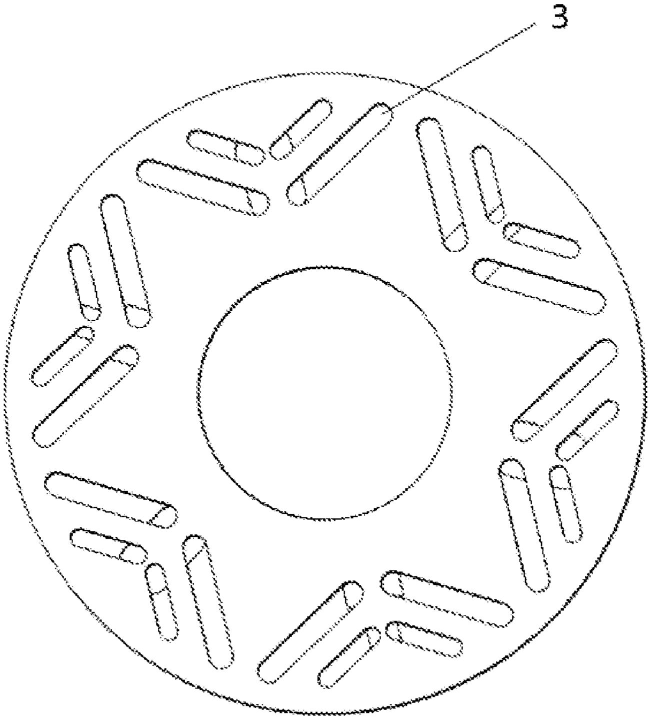
FIG. 6 is a schematic drawing of a rotor body and an end plate of a rotor for an electric machine according to another embodiment of the present disclosure.

As shown in FIGS. 5 and 6, the slot 8 extends outwards from an inner edge of the corresponding end plate and at least partly covers the gap 5. The inner edge of the end plate is an edge of the end plate that is located at the inside in a radial direction, or an edge of the end plate that is near the rotor shaft. As shown in FIG. 6, by covering part of the gap 5, the slot 8 achieves fluid communication with the gap 5, thus enabling unhindered circulation of the cooling medium.

As shown in FIG. 5, the slots 8 and through-holes 9 of at least one of the first end plate 6 and second end plate 7 are arranged equidistantly in the circumferential direction of the corresponding end plate. In the case of circulation in both directions, the slots 8 and through-holes 9 on both the first end plate 6 and second end plate 7 are arranged equidistantly in the circumferential direction of the corresponding end plate. This depends on the arrangement of magnets in the rotor interior. Of course, arrangement at non-equal intervals in the circumferential direction is also possible, as long as the slots and through-holes correspond to the gaps in a direction parallel to the rotation axis A.

As shown in FIG. 7, the magnet mounting grooves 3 comprise multiple groups of mounting slots which are radially offset. FIG. 7 shows two groups of mounting slots, wherein mounting slots of the same group are substantially located on a circumference at the same distance from the rotation axis. For example, a first group of magnet mounting grooves 31 is arranged substantially radially inward of a second group of magnet mounting grooves 32. In addition, adjacent magnet mounting grooves in the same group of mounting slots form a substantially V-shaped arrangement. A V-shaped arrangement formed by two magnet mounting grooves in the first group of magnet mounting grooves 31 is substantially parallel to a V-shaped arrangement formed by two magnet mounting grooves in the second group of magnet mounting grooves 32. As shown in FIG. 5, the radially extending slots 8 and through-holes 9 are respectively aligned with the gaps of the multiple groups of mounting slots, so as to achieve fluid communication. In this way, it is possible to achieve larger magnet mounting grooves, and a larger area of coincidence of the slots and through-holes with the magnet mounting grooves; as shown in FIG. 6, this means that the fluid circulation cross section can be larger.

Again referring to FIGS. 5 and 6, the slots 8 may extend radially outwards in a tapering manner. This is because the multiple groups of mounting slots which are radially offset have different-sized gaps, so there is no need to provide slots of radially uniform size.

The rotor of the electric machine of the present disclosure has a fluid cooling system, which can achieve cooling of the rotor, and in particular the rotor interior and magnets. In addition, by using a bidirectional circulation configuration to perform cooling, the rotor of the electric machine of the present disclosure can increase the cooling efficiency. Thus, the present disclosure can solve the problems of magnet demagnetization caused by high temperatures and splitting of the rotor into layers due to high rotation speeds at high temperatures, such that the electric machine has improved stability and reliability. Further, compared with a water-cooled electric machine, the power of the electric machine with effective rotor cooling of the present disclosure can be increased, e.g. by 20% to 30%.

According to another aspect of the present disclosure, a vehicle is proposed, comprising the electric machine mentioned above. The vehicle may be an electrified vehicle, such as a battery electric vehicle (BEV), a hybrid electric vehicle (HEV), a plug-in hybrid electric vehicle (PHEV), a range extended EV and a fuel cell electric vehicle (FCEV). The vehicle may also be a hydrogen-powered vehicle.

It should be understood that the structures described above and shown in the drawings are only examples of the present disclosure, which may be replaced by other structures exhibiting the same or similar functions for obtaining the desired end result. In addition, it should be understood that an embodiment described above and shown in the drawings should be deemed to merely constitute a non-restrictive example of the present disclosure, and that it may be modified in various manners within the scope defined by the claims.

The invention claimed is:

1. A rotor for an electric machine, the rotor comprising:
a rotor shaft, having a rotation axis;
a rotor body, fixed to the rotor shaft and formed of multiple stacked laminations, wherein magnet mounting grooves are provided in the rotor body;
a plurality of magnets disposed in the magnet mounting grooves, with a gap formed between each magnet and an inner wall of the corresponding magnet mounting grooves;
a first end plate and a second end plate, respectively disposed at two ends of the rotor body along the rotation axis, and
a fluid cooling system, the fluid cooling system comprising:
a slot, disposed on one of the first end plate and second end plate, and located on a side of the end plate that faces towards the rotor body;
a through-hole, disposed on the other of the first end plate and second end plate; and
the gap,
wherein the slot, the gap and the through-hole are in fluid communication to form a cooling medium channel,
wherein the magnet mounting grooves comprise multiple groups of mounting grooves which are radially offset, the slot and the through-hole being respectively aligned with gaps of the multiple groups of mounting grooves,
wherein adjacent magnet mounting grooves in a same group of mounting grooves form a substantially V-shaped arrangement, the V-shaped arrangement formed by two mounting grooves in a first group of mounting grooves being substantially parallel to the V-shaped arrangement formed by two mounting grooves in a second group of mounting grooves, and
wherein the slot extends radially outwards in a tapering manner such that a width of the slot in a circumferential direction is greater at a radially inner end of the slot than at a radially outer end of the slot.

2. The rotor according to claim 1, wherein the fluid cooling system further comprises an opening disposed on a wall of the rotor shaft, the opening being in fluid communication with the slot, and a cooling medium being able to flow from the opening into the cooling medium channel.

3. The rotor according to claim 2, wherein the cooling medium is recovered after sequentially flowing through the opening, the slot, the gap and the through-hole.

4. The rotor according to claim 3, wherein slots and through-holes arranged alternately are provided on each of the first end plate and second end plate.

5. The rotor according to claim 3, wherein the magnets are disposed in the magnet mounting grooves by snap-fitting.

6. An electric machine, comprising a stator and the rotor according to claim 3.

7. The rotor according to claim 2, wherein the slot extends outwards from an inner edge of the corresponding end plate and at least partly covers the gap.

8. The rotor according to claim 7, wherein slots and through-holes arranged alternately are provided on each of the first end plate and second end plate.

9. The rotor according to claim 2, wherein slots and through-holes arranged alternately are provided on each of the first end plate and second end plate.

10. The rotor according to claim 2, wherein the magnets are disposed in the magnet mounting grooves by snap-fitting.

11. An electric machine, comprising a stator and the rotor according to claim 2.

12. The rotor according to claim 1, wherein slots and through-holes arranged alternately are provided on each of the first end plate and second end plate.

13. The rotor according to claim 12, wherein the slots and through-holes of at least one of the first end plate and second end plate are arranged equidistantly in the circumferential direction of the corresponding end plate.

14. The rotor according to claim 1, wherein the magnets are disposed in the magnet mounting grooves by snap-fitting.

15. An electric machine, comprising a stator and the rotor according to claim 1.

16. A vehicle, comprising the electric machine according to claim 15.

* * * * *